(12) United States Patent
Connerley

(10) Patent No.: US 7,281,494 B1
(45) Date of Patent: Oct. 16, 2007

(54) PET WATER SUPPLY SYSTEM

(76) Inventor: Jason A. Connerley, 8524 E. Mission Ave., Spokane Valley, WA (US) 99212

( * ) Notice: Subject to any disclaimer, the term of this patent is extended or adjusted under 35 U.S.C. 154(b) by 0 days.

(21) Appl. No.: 11/371,952

(22) Filed: Mar. 10, 2006

(51) Int. Cl.
*A01K 7/00* (2006.01)
(52) U.S. Cl. ......................................... 119/77; 119/74
(58) Field of Classification Search ................. 119/72, 119/74, 77, 78, 79, 80, 255, 61.5, 51.5, 69.5, 119/51.01, 52.1; 239/17; D30/132; D23/201
See application file for complete search history.

(56) References Cited

U.S. PATENT DOCUMENTS

| | | | |
|---|---|---|---|
| 2,877,051 A | 3/1959 | Cushman et al. | |
| 5,501,178 A | 3/1996 | Kemp | |
| 5,799,609 A * | 9/1998 | Burns et al. | ............... 119/74 |
| 6,055,934 A | 5/2000 | Burns et al. | |
| 6,622,657 B2 | 9/2003 | Northrop et al. | |
| D486,612 S | 2/2004 | Ross | |
| 2004/0118356 A1 | 6/2004 | Krishnamurthy | |
| 2006/0207515 A1 * | 9/2006 | Palett et al. | ............... 119/78 |

* cited by examiner

Primary Examiner—T. Nguyen

(57) ABSTRACT

A pet water supply system includes a housing that has a bottom wall, a top wall and a peripheral wall that is attached to and extends between the top and bottom walls. A basin is integrally coupled to the peripheral wall and is positioned adjacent to the bottom wall. A water outlet extends through the peripheral wall and fluidly couples the housing to the basin. A drain conduit is fluidly coupled to the basin. A pump is fluidly coupled to the drain conduit and to the housing. The pump is configured to pull the water through the drain conduit and depositing the water into the housing. A water filter is in fluid communication with the drain conduit and filters that is moved through the drain conduit by the pump.

6 Claims, 3 Drawing Sheets

PET WATER SUPPLY SYSTEM

BACKGROUND OF THE INVENTION

1. Field of the Invention

The present invention relates to pet water holding devices and more particularly pertains to a new pet water holding device for constantly supplying a pet with clean and fresh water which is periodically filtered to ensure that water is clean.

2. Description of the Prior Art

The use of pet water holding devices is known in the prior art. While these devices fulfill their respective, particular objectives and requirements, the need remains for a system that is configured not only to re-supply a pet's water dish with new water once it has been emptied by the pet but to also periodically filter water that is positioned within the dish to ensure that the water the pet is drinking is clean.

SUMMARY OF THE INVENTION

The present invention meets the needs presented above by generally comprising a housing that has a bottom wall, a top wall and a peripheral wall that is attached to and extends between the top and bottom walls. A basin is integrally coupled to the peripheral wall and is positioned adjacent to the bottom wall. A water outlet extends through the peripheral wall. A drain conduit is fluidly coupled to the basin. A pump is fluidly coupled to the drain conduit and to the housing. The pump is configured to pull the water through the drain conduit and depositing the water into the housing. A water filter is in fluid communication with the drain conduit and filters water that is moved through the drain conduit by the pump.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
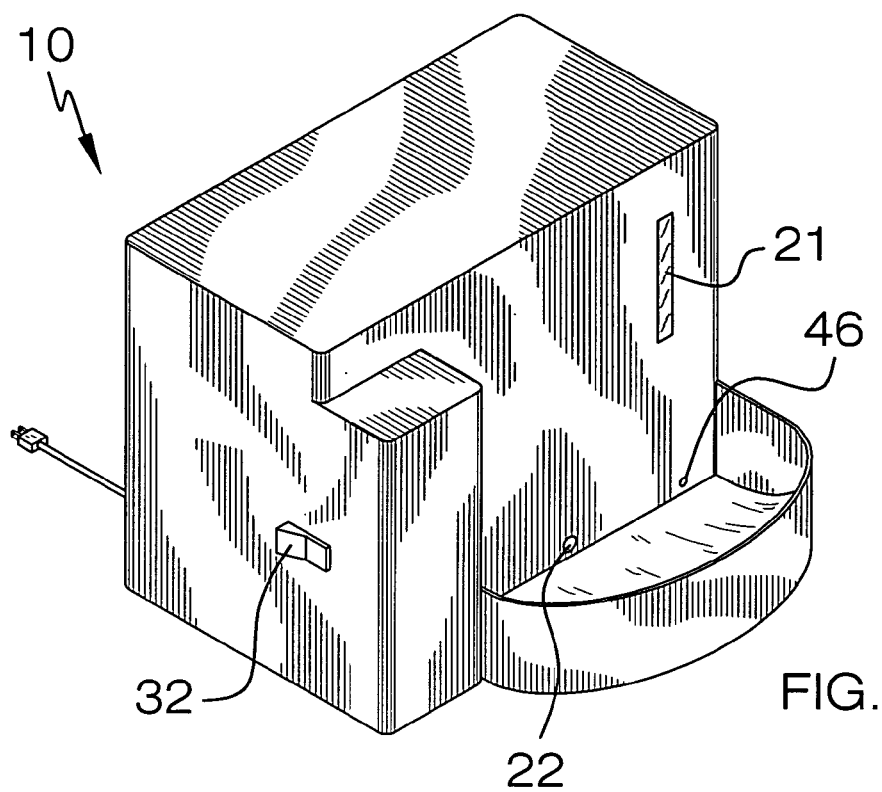
FIG. 1 is a front right perspective view of a pet water supply system according to the present invention.
Figure 2:
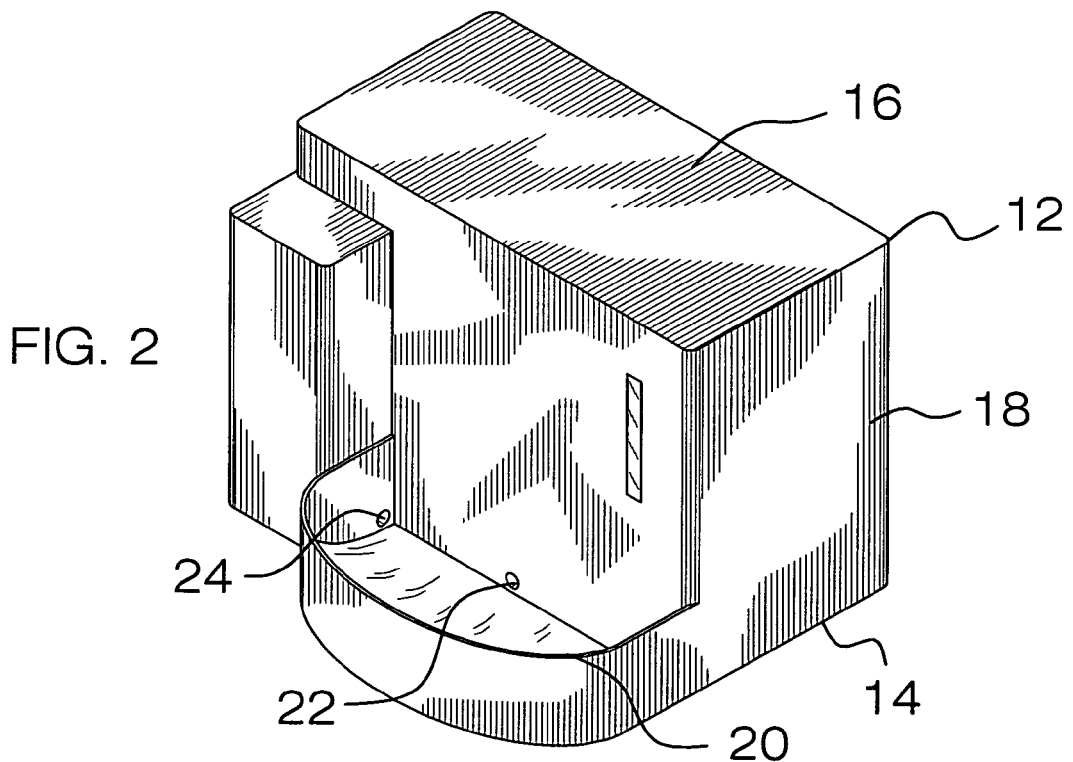
FIG. 2 is a front left perspective view of the present invention.
Figure 3:
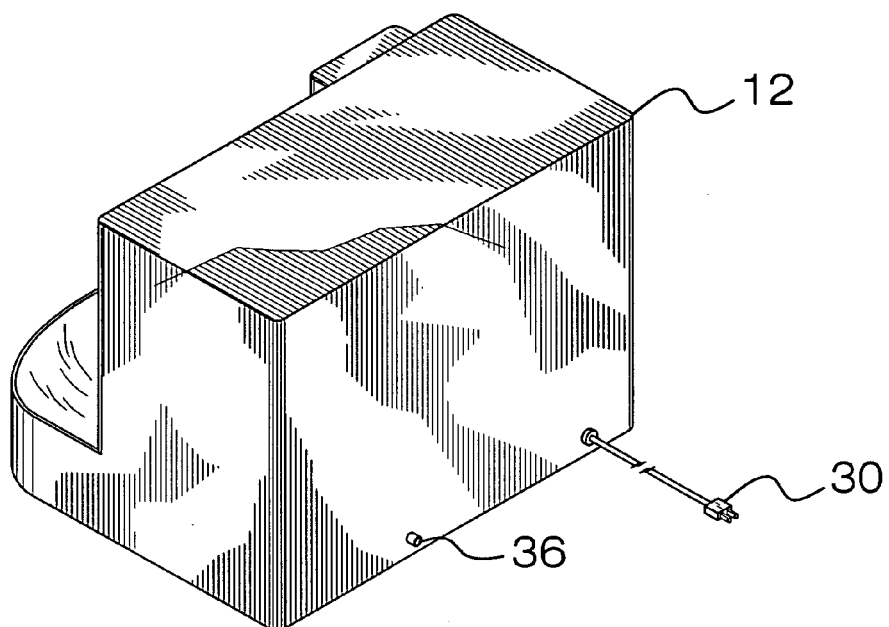
FIG. 3 is a back perspective view of the present invention.
Figure 4:
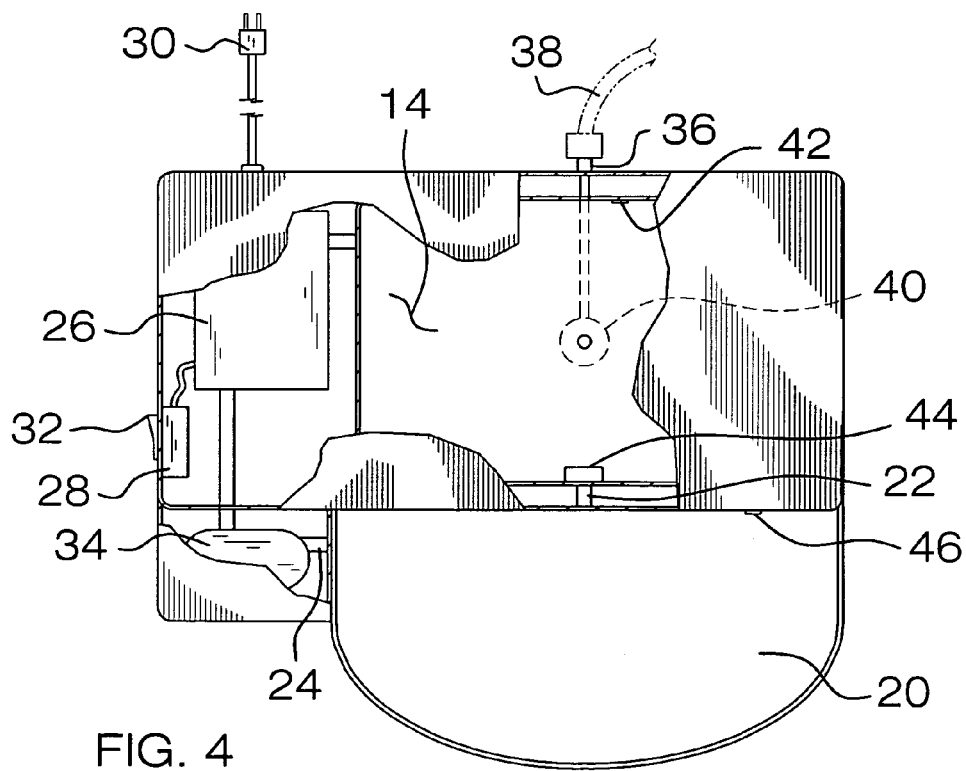
FIG. 4 is a top broken view of the present invention.
Figure 5:
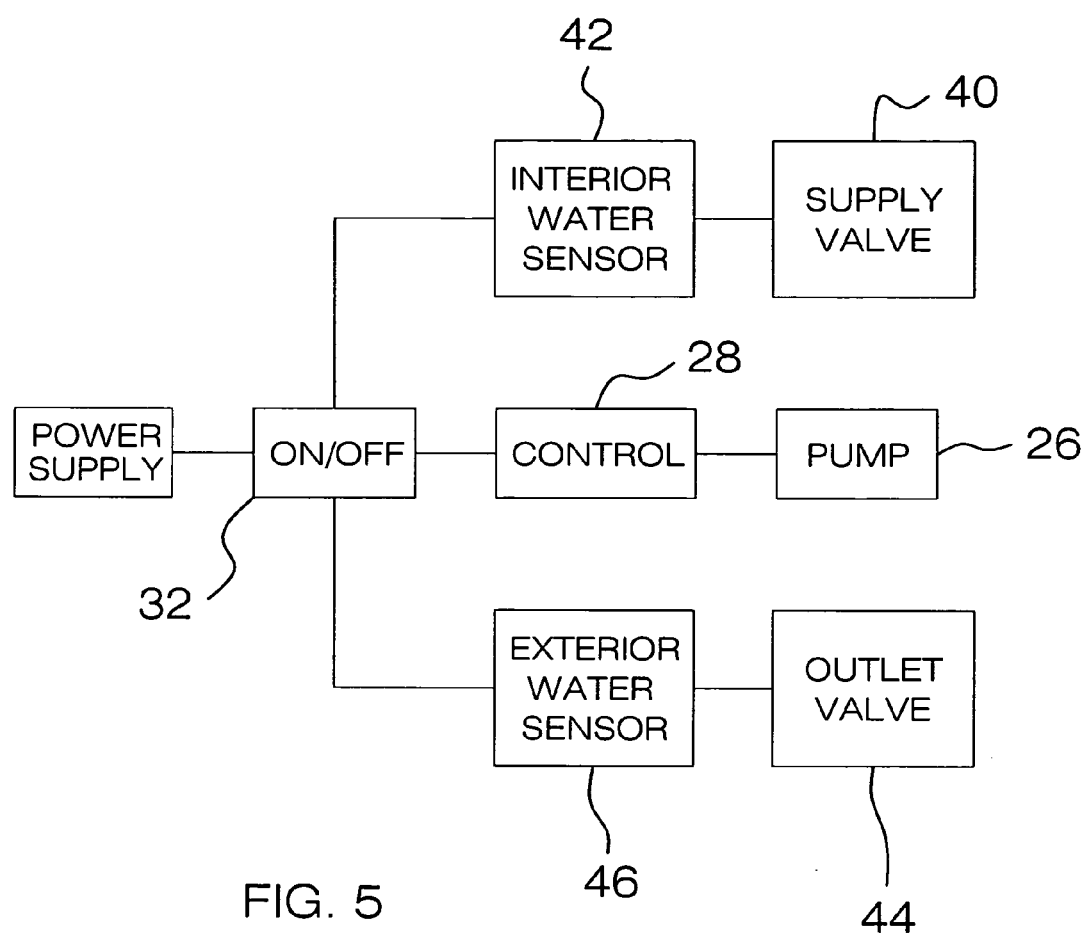
FIG. 5 is a schematic view of the present invention.

With reference now to the drawings, and in particular to FIGS. 1 through 5 thereof, a new pet water holding device embodying the principles and concepts of the present invention and generally designated by the reference numeral 10 will be described.

As best illustrated in FIGS. 1 through 5, the pet water supply system 10 generally comprises a housing 12 that has a bottom wall 14, a top wall 16 and a peripheral wall 18 that is attached to and extends between the top 16 and bottom 14 walls. A basin 20 is integrally coupled to the peripheral wall 18. The basin 20 is positioned adjacent to the bottom wall 14. A water outlet 22 extends through the peripheral wall 18 and fluidly couples the housing 12 to the basin 20. The housing may include a window 21 for verifying the level of water within the housing 12.

A drain conduit 24 is fluidly coupled to the basin 20. A pump 26 is fluidly coupled to the drain conduit 24 and to the housing 12. The pump 26 is configured to pull the water through the drain conduit 24 and deposit the water into the housing 12. A control 28 is operationally coupled to the pump 26 and is configured to alternately turn the pump 26 on or off at predetermined time intervals. The control 28 may be plugged into a power outlet by way of a male electrical plug 30. The control 28 may comprise a pre-programmed processor. An actuator 32 is electrically coupled to the control 28 to selectively turn the control 28, and the entire system 10, on or off. A water filter 34 is in fluid communication with the drain conduit 24 and filter water that is moved through the drain conduit 24 by the pump 26. The pump 26 is preferably turned on at least once every three hours and for a duration of between 5 seconds and 5 minutes.

A water intake conduit 36 extends through the peripheral wall 18 and is in fluid communication with an interior of the housing 12. The water intake conduit 36 is fluidly coupled to a water supply 38. A supply valve 40 is fluidly coupled to the water intake conduit 36. An interior water sensor 42 is mounted within the housing 12 and is operationally coupled to the supply valve 40. The interior water sensor 42 is configured to detect water in the housing 12. The interior water sensor 42 is configured to open the supply valve 40 when a water level within the housing 12 is below a predetermined height and to close the supply valve 40 when the water level is above the predetermined height. Alternatively, the housing 12 may include a closable opening for filling the housing 12 with water by hand.

An outlet valve 44 is fluidly coupled to the water outlet 22. An exterior water sensor 46 is mounted in the basin 20 and is operationally coupled to the outlet valve 44. The exterior water sensor 46 is configured to detect water in the basin 20. The exterior water sensor 46 is configured to open the outlet valve 44 when no water is detected in the basin 20 and to close the outlet valve 44 when water is detected in the basin 20. Each of the outlet 44 and supply 40 valves may include solenoid actuated valves.

In use, water that is positioned in the basin 20 is pulled through the water filter 34 and re-deposited in the housing 12 if the water sits in the basin 20 for too long of a time period. This will ensure that the water in the basin 20 is always clean. When the water is removed from the basin 20, either by the pump 34 or a pet, the outlet valve 44 is opened to refill the basin 20 with clean water from the housing 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A water providing system for a pet, said system comprising:
   a housing having a bottom wall, a top wall and a peripheral wall being attached to and extending between said top and bottom walls;
   a basin being integrally coupled to said peripheral wall, said basin being positioned adjacent to said bottom wall;
   a water outlet extending through said peripheral wall and fluidly coupling said housing to said basin;
   a drain conduit being fluidly coupled to said basin;
   a pump being fluidly coupled to said drain conduit and to said housing, said pump being configured to pull said water through said drain conduit and depositing the water into said housing;
   a water filter being in fluid communication with said drain conduit and filtering water being moved through said drain conduit by said pump;
   a water intake conduit extending through said peripheral wall and being in fluid communication with an interior of said housing, said water intake conduit being fluidly coupled to a water supply;
   a supply valve being fluidly coupled to said water intake conduit, and
   an interior water sensor being mounted within said housing and being operationally coupled to said supply valve, said interior water sensor being configured to detect water in said housing, said interior water sensor being configured to open said supply valve when a water level within said housing is below a predetermined height and to close said supply valve when the water level is above the predetermined height.

2. The system according to claim 1, further including a control being operationally coupled to said pump and being configured to alternately turn said pump on or off at predetermined time intervals.

3. The system according to claim 2, further including:
   an outlet valve being fluidly coupled to said water outlet; and
   an exterior water sensor being mounted in said basin and being operationally coupled to said outlet valve, said exterior water sensor being configured to detect water in said basin, said exterior water sensor being configured to open said outlet valve when no water is detected in said basin and to close said outlet valve when water is detected in said basin.

4. The system according to claim 1, further including:
   an outlet valve being fluidly coupled to said water outlet; and
   an exterior water sensor being mounted in said basin and being operationally coupled to said outlet valve, said exterior water sensor being configured to detect water in said basin, said exterior water sensor being configured to open said outlet valve when no water is detected in said basin and to close said outlet valve when water is detected in said basin.

5. The system according to claim 4, further including a control being operationally coupled to said pump and being configured to pump and being configured to alternately turn said pump on or off at predetermined time intervals.

6. A water providing system for a pet, said system comprising:
   a housing having a bottom wall, a top wall and a peripheral wall being attached to and extending between said top and bottom walls;
   a basin being integrally coupled to said peripheral wall, said basin being positioned adjacent to said bottom wall;
   a water outlet extending through said peripheral wall and fluidly coupling said housing to said basin;
   a drain conduit being fluidly coupled to said basin;
   a pump being fluidly coupled to said drain conduit and to said housing, said pump being configured to pull said water through said drain conduit and depositing the water into said housing;
   a control being operationally coupled to said pump and being configured to alternately turn said pump on or off at predetermined time intervals;
   a water filter being in fluid communication with said drain conduit and filtering water being moved through said drain conduit by said pump;
   a water intake conduit extending through said peripheral wall and being in fluid communication with an interior of said housing, said water intake conduit being fluidly coupled to a water supply;
   a supply valve being fluidly coupled to said water intake conduit;
   an interior water sensor being mounted within said housing and being operationally coupled to said supply valve, said interior water sensor being configured to detect water in said housing, said interior water sensor being configured to open said supply valve when a water level within said housing is below a predetermined height and to close said supply valve when the water level is above the predetermined height;
   an outlet valve being fluidly coupled to said water outlet; and
   an exterior water sensor being mounted in said basin and being operationally coupled to said outlet valve, said exterior water sensor being configured to detect water in said basin, said exterior water sensor being configured to open said outlet valve when no water is detected in said basin and to close said outlet valve when water is detected in said basin.

* * * * *